United States Patent
Menday et al.

(10) Patent No.: US 7,500,809 B2
(45) Date of Patent: Mar. 10, 2009

(54) SECURITY SYSTEM

(75) Inventors: Malcolm John Menday, Coogee (AU); David Robert Higgins, Thornlands (AU)

(73) Assignee: Lamson Concepts PTY Limited, New South Wales (AU)

( * ) Notice: Subject to any disclaimer, the term of this patent is extended or adjusted under 35 U.S.C. 154(b) by 0 days.

(21) Appl. No.: 10/516,532

(22) PCT Filed: Jun. 4, 2003

(86) PCT No.: PCT/AU03/00699
§ 371 (c)(1), (2), (4) Date: Jun. 13, 2005

(87) PCT Pub. No.: WO03/101867
PCT Pub. Date: Dec. 11, 2003

(65) Prior Publication Data
US 2005/0265794 A1    Dec. 1, 2005

Related U.S. Application Data

(60) Provisional application No. 60/406,937, filed on Aug. 27, 2002.

(30) Foreign Application Priority Data
Jun. 4, 2002    (AU) ..................... PS 2743

(51) Int. Cl.
*B65G 51/06*    (2006.01)
(52) U.S. Cl. ................. 406/188; 406/187; 406/189
(58) Field of Classification Search ............... 406/187, 406/188, 189
See application file for complete search history.

(56) References Cited

U.S. PATENT DOCUMENTS

| | | | | | |
|---|---|---|---|---|---|
| 2,288,427 | A | * | 6/1942 | Anderson | 406/37 |
| 2,336,934 | A | * | 12/1943 | Hornsby | 406/37 |
| 2,934,285 | A | * | 4/1960 | Niehaus | 406/186 |
| 3,117,743 | A | * | 1/1964 | Gerhard et al. | 406/37 |
| 3,580,527 | A | * | 5/1971 | Cynober | 406/84 |
| 3,627,231 | A | * | 12/1971 | Kalthoff | 406/3 |
| 3,642,232 | A | * | 2/1972 | Kelley | 406/189 |

(Continued)

FOREIGN PATENT DOCUMENTS

AU    78397/98    2/1999

(Continued)

*Primary Examiner*—Douglas A Hess
(74) *Attorney, Agent, or Firm*—Sughrue Mion, PLLC (57) ABSTRACT

The present invention relates to apparatus for transferring security documents. The apparatus is formed from a carrier adapted for use in an air tube system capable of transporting the carrier from a source to a destination. The carrier includes a substantially cylindrically shaped housing (10) which cooperates with the tube to allow the carrier to be transported. The housing includes an internal cavity (10A), and is coupled to a lid (17) and a base (18) to enclose the cavity. The lid includes an aperture (17A) to allow documents to be inserted into the cavity, with the base being removable via a lock to allow the security documents to be removed. The invention also claims an air tube system for transferring security documents, the system including a controller adapted to control a number of control stations (21A, 21B, . . . 21G) for selectively transferring carriers along interconnecting tubes between loading stations and destination stations.

29 Claims, 9 Drawing Sheets

U.S. PATENT DOCUMENTS

| | | | |
|---|---|---|---|
| 3,756,537 A * | 9/1973 | Freese | 406/188 |
| 3,940,091 A * | 2/1976 | Ekama et al. | 406/186 |
| 4,273,478 A | 6/1981 | Cedergren | 406/189 |
| 4,324,511 A * | 4/1982 | Irish | 406/189 |
| 4,362,443 A * | 12/1982 | Mallory et al. | 406/188 |
| 4,470,730 A * | 9/1984 | Wuthrich | 406/186 |
| 4,478,061 A | 10/1984 | Preddey | |
| 4,792,263 A * | 12/1988 | Podoll | 406/189 |
| 4,941,777 A * | 7/1990 | Kieronski | 406/13 |
| 5,864,485 A * | 1/1999 | Hawthorne et al. | 700/229 |
| 6,276,877 B1 * | 8/2001 | Crawford | 406/189 |
| 6,672,808 B1 * | 1/2004 | McIntyre et al. | 406/197 |
| 7,077,604 B1 * | 7/2006 | Fowler | 406/188 |

FOREIGN PATENT DOCUMENTS

| | | |
|---|---|---|
| DE | 33 32 452 | 3/1984 |
| EP | 0 878 423 | 11/1998 |
| FR | 2 508 668 | 12/1982 |
| SU | 1260-311 | 9/1986 |
| SU | 1643-352 | 4/1991 |
| WO | WO 00/14366 A1 | 3/2000 |
| WO | WO 01/51392 | 7/2001 |

* cited by examiner

SECURITY SYSTEM

The present application is based on International Application No. PCT/AU03/00699, filed Jun. 4, 2003, which application claims priority to Australian Application No. PS2743, filed Jun. 4, 2002, and claims the benefit of U.S. Provisional Application Ser. No. 60/406,937, filed Aug. 27, 2002.

BACKGROUND OF THE INVENTION

The present invention relates to a carrier and a system for transporting security documents, and in particular security documents such as cash.

DESCRIPTION OF THE PRIOR ART

The reference to any prior art in this specification is not, and should not be taken as, an acknowledgement or any form of suggestion that the prior art forms part of the common general knowledge in Australia.

Currently, it is known to transport cash and other security documents, using air tube systems. In air tube systems, the documents are located in a carrier, which is in turn placed in a tube. The carrier creates a seal with the tube, such that the carrier may be sucked along the tube from a loading point, to a collection point, thereby allowing the documents to be transported.

However, the level of security provided by the system is minimal. For example, the carriers are not generally secure and can therefore be intercepted along the tube length, allowing the contents to be examined or removed. This also allows individuals interacting with the carrier, such as the individuals loading or removing the carrier from the tube, to access the contents of the carrier, which may be undesirable.

This is particularly important in situations where large quantities of cash are handled, such as in the gaming industry. For example, when cash is collected from the gaming tables, it is important to ensure that the cash is securely transported from the table to a counting room, particularly as quantities can often involve tens or hundreds of thousands of dollars.

Currently, cash collected at the tables is inserted through a slot in the table surface and into a security box, which is locked into the table. At a suitable time, such as when the box is fill, the box is unlocked from the table by a security guard. The guard then transports the cash to the gaming room. Security cameras typically monitor this procedure.

Even using the security guard does not assure security as the guard may be attacked, or even take the cash themselves. Accordingly, when large amounts of money are involved, often several security guards are required, which in turn can prove prohibitively expensive. Currently however, other forms of transport system, such as air tube systems are too insecure to allow such large amounts of money to be transferred in this fashion.

SUMMARY OF THE PRESENT INVENTION

In a first broad form the present invention provides apparatus for transferring security documents, the apparatus being formed from a carrier adapted for use in an air tube system, the air tube system having a tube for transporting the carrier from a source to a destination, the carrier including:
  a) A substantially cylindrically shaped housing defining an internal cavity, the housing being adapted to cooperate with the tube in use, to allow the carrier to be transported;
  b) A lid coupled to a first end of the housing, the lid including an aperture adapted to allow documents to be inserted into the cavity in use;
  c) A base removably mounted to a second end of the housing opposite the first, the base being removable to allow access to the cavity, and,
  d) A lock for retaining the base in place.

The lock is preferably formed from a dual key bi-lock mechanism.

The aperture may be formed from a narrow slot.

The carrier typically includes:
  a) A shutter movably mounted to the lid, the shutter being adapted to move between an open position, and a closed position in which the aperture is blocked;
  b) A shutter opening system positioned in the cavity, and being adapted to be activated manually to thereby allow the shutter to be opened, the; and,
  c) A shutter closing mechanism, the shutter closing mechanism being provided on the outside of the housing, and being adapted to be activated once security documents have been inserted into the cavity.

The carrier can b adapted to be positioned in a docking station, to allow the carrier to be positioned in a gaming table in use, with the aperture aligned with a game table slot.

The gaming table typically includes an actuator for activating the shutter closing mechanism when the carrier is removed from the gaming table.

The carrier may include an identifier, the air tube system including a number of detectors positioned at respective locations in the air tube system, the detectors being adapted to:
  a) Detect the identifier of carriers traversing the location; and,
  b) Transfer an indication of the identifier to a controller adapted to determine the location of the carrier in accordance with the detector and the identifier.

The carrier typically includes a communications system for transferring an indication of the identifier to the detector.

The transmitting system may be formed from an RFID system.

In a second broad form the present invention provides a docking system for receiving a carrier for transporting security documents, the carrier having a cylindrically shaped housing having an aperture in a first end for receiving the documents, the docking system including a substantially cylindrical shaped cavity adapted to receive the carrier, the docking system being adapted to cooperate with a gaming table such that documents inserted through a gaming table slot are received by the carrier aperture.

The docking system may include a locking mechanism, the locking mechanism being adapted to selectively retain the carrier in the cavity.

The docking system can be adapted to cooperate with an aperture in the gaming table, to allowing the docking stations to be moved from an open position in which the cavity is accessible to allow the carrier to be inserted therein, and a closed position in which the carrier aperture is aligned with the slot.

The cavity may include one or more guides, the guides being adapted to cooperate with one or more carrier guides mounted to carrier to thereby align the carrier in the cavity.

The docking system can be adapted to receive a carrier according to the first road form of the invention.

In a third broad form the present invention provides a controller adapted for use in an air tube system, the air tube system including a number of controlling stations for selectively transferring carriers along interconnecting tubes between loading stations and destination stations, and one or more detectors for detecting the position of the carrier within the tubes, the controller being adapted to:
  a) Cause the controlling stations to transfer a carrier loaded at a respective loading station to a destination station;
  b) Monitor signals from the detectors to determine the changes in the position of carriers;
  c) Compare the changes in the position of each carrier to predetermined criteria; and,
  d) Generate an indication in response to the comparison.

Each carrier preferably includes a respective identifier, the detectors being adapted to determine the respective identifier of each carrier and transfer an indication of this to the controller, the controller being responsive to the identifier and the respective detector to determine the position of the respective carrier.

The controller is preferably adapted to transfer the carrier between respective loading and destination stations in accordance with the respective identifier.

The controller can include:
  a) A store for storing the predetermined criteria in the form of predetermined thresholds; and,
  b) A processor coupled to the store, the processor being adapted to:
    i) Determine the current position of the carrier;
    ii) Store an indication of the current position in the store;
    iii) Compare the current time taken to move between subsequent positions to the selected ones of the predetermined thresholds stored in the memory; and,
    iv) Generate an alert in accordance with an unsuccessful comparison.

The alert may be at least one of an audible or visual alert, and this may be generated at a device remote to the processing system.

The predetermined threshold may be selected in accordance with the most recent position of the carrier.

The processor can be further adapted to store an indication of the carrier positions together with an associated time indication in the store.

In a fourth broad form the present invention provides an air tube system for transferring security documents, the air tube system including:
  a) A number of tubes;
  b) One or more loading stations coupled to the tubes, the loading stations being adapted to allow carriers including security documents to be loaded into the tubes;
  c) One or more destination stations coupled to the tubes, the destination stations being adapted to receive carriers from the tubes;
  d) A pump for pumping into, or out of selected ones of the tubes;
  e) One or more controlling stations for selectively interconnecting the tubes;
  f) A number of detectors for detecting the position of the carrier within the
  g) A controller coupled to the controlling stations and the detectors, the controller being adapted to:
    i) Cause the controlling stations to transfer a carrier loaded at a respective loading station to a destination station; and,
    ii) Monitor signals from the detectors to determine the changes in the position of carriers.

The controller can be further adapted to:
  a) Compare the changes in the position of each carrier to predetermined criteria; and,
  b) Generate an indication in response to the comparison.

The controller may be a controller according to the third broad form of the invention, and the carrier may be a carrier according to the first broad form of the invention.

In a fifth broad form the present invention provides a system for transferring security documents, the system including:
  c) A carrier according to the first broad form of the invention; and,
  d) An air tube system according to the fourth broad form of the invention.

The system may be adapted for use in a gaming environment, the system further including a docking station according to the second broad form of the invention.

In a sixth broad form the present invention provides a method of transferring security documents from a source to a destination, the method including:
  a) Loading the security documents into a carrier;
  b) Transferring the carrier from a loading station to a destination station via an air tube system;
  c) Detecting the position of the carrier within the air tube system;
  d) Compare the position of the carrier within the air tube system to predetermined criteria; and,
  e) Generate an indication in accordance with the results of the comparison.

The method is preferably performed using the carrier of the first broad form of the invention, and a controller according to the third broad form of the invention.

BRIEF DESCRIPTION OF THE DRAWINGS

An example of the present invention will now be described with reference to the accompanying drawings, in which.

DETAILED DESCRIPTION OF THE PREFERRED EMBODIMENTS

Figure 1:
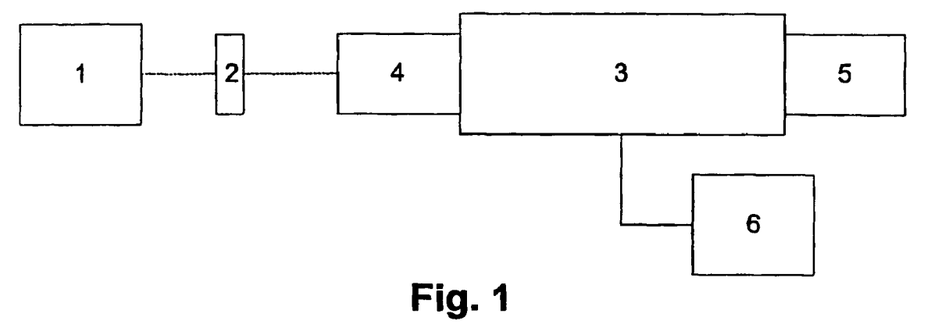
FIG. 1 is schematic diagram of an example of a system according to the present invention.

An example of the present invention will now be described with reference to FIG. 1, which shows an example of a system for implementing secure document transport.

As shown the system is formed from an optional docking station 1, a carrier 2, and an air tube system 3 that couples one or more loading stations 4 to one or more destination stations 5. In general, operation and monitoring of the air tube system 3 is achieved using a processing system 6.

Figure 2A:
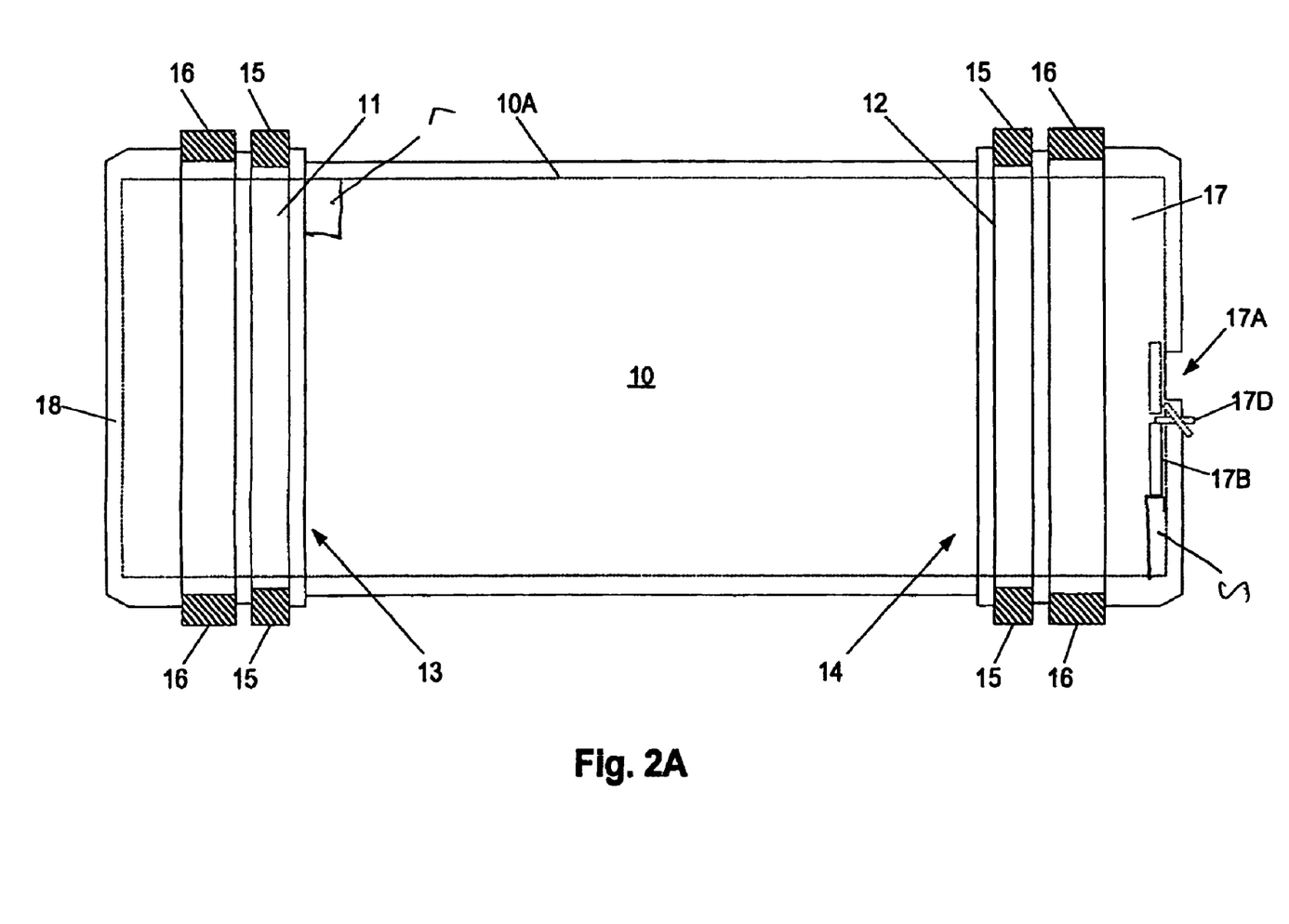
FIG. 2A is a schematic diagram of an example of the carrier of FIG. 1.
Figure 2B:
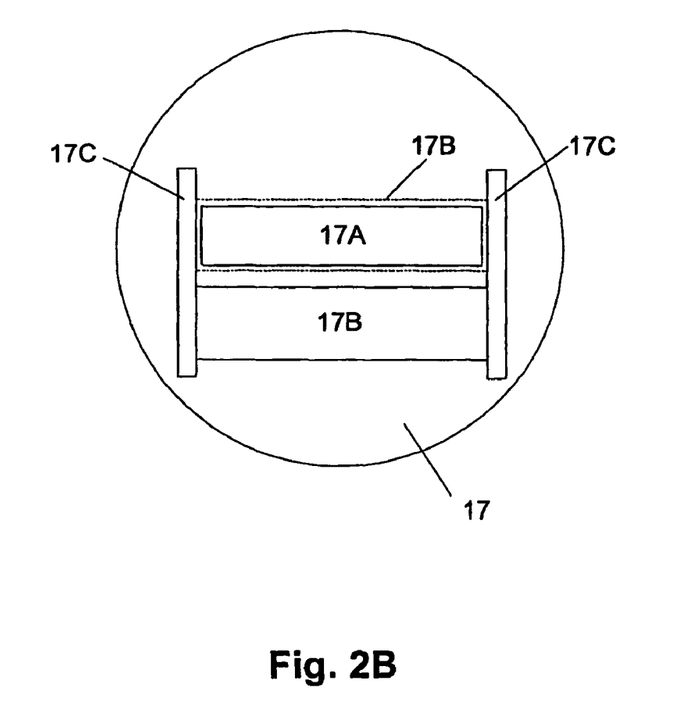
FIG. 2B is a schematic plan view of an example of the lid of FIG. 2A.

The carrier 2 is shown in more detail in FIGS. 2A and 2B. As shown in FIG. 2A, the carrier is formed from a generally cylindrically shaped body 10 that defines an internal cavity shown by the dotted line 10A. Cylindrically shaped mountings 11, 12 are positioned at respective ends 13, 14 of the body 10, with each mounting having a drive ring 15, which is typically formed from rubber such as a synthetic rubber like polypropylene, and an alignment ring 16, which may be formed from a material such as Velcro or the like.

The carrier 2 includes a lid 17 fixed to the carrier 2 at one end of the body 10, and a base 18, which is removably mounted to the carrier either by connecting the base 18 to the body 10, or the second mounting 13. In use the base is held in place by a lock L, such as a dual bi-lock.

As shown in plan view in FIG. 2B, the lid includes an aperture 17A. A shutter 17B is mounted to the lid 17 via guide rails 17C. In use, the shutter is adapted to move between an open position, in which the shutter is located clear of the aperture 17A allowing security documents to be inserted there through, and a closed position shown by the dotted lines in which the shutter 17B blocks the aperture 17A.

In one example, the shutter is urged towards the closed position by a biasing means S, such as a spring or the like. The shutter is retained in the open position using a latch 17D. This configuration is designed such that when the latch is released as shown by the dotted lines in FIG. 2A, the shutter 17B is automatically urged into the closed position to thereby prevent objects being inserted through the aperture. Furthermore, as the shutter is located inside the cavity 10A when the lid is fixed to the body 10, this ensures that the shutter can only be returned to the open position by removing the base 18 to gain access to the cavity 10A.

This ensures that once the shutter 17B is closed, access to the contents of the cavity 10A can only be achieved by removing the base 18.

Figure 3:
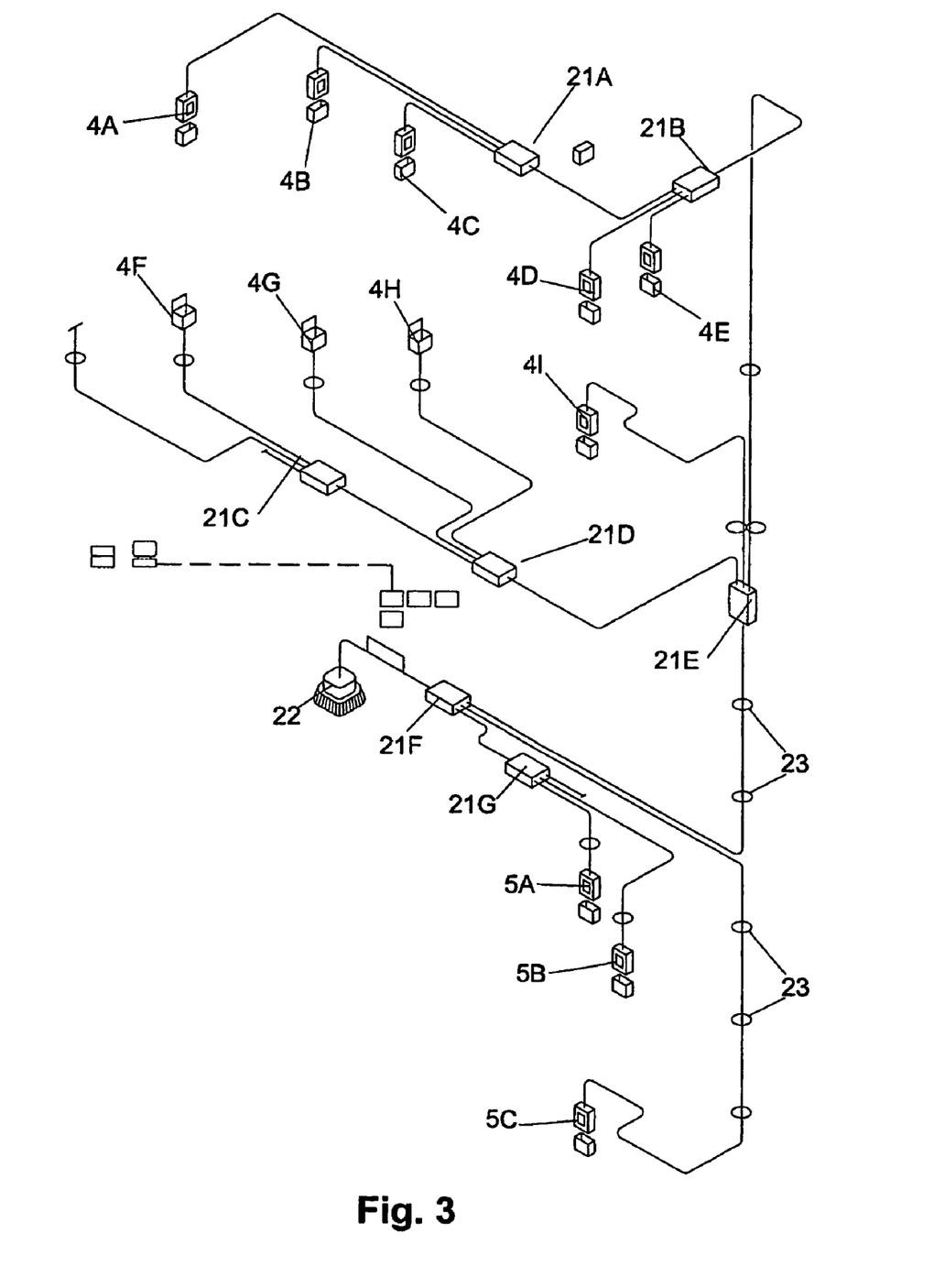
FIG. 3 is a schematic diagram of an example of the air tube system of FIG. 1.

The carrier 2 is adapted to be inserted into a loading station 4, allowing the carrier to be transported to an appropriate destination station 5 by the air tube system 3. An example of a typical air tube system configuration is shown in FIG. 3. In this example, the air tube system includes a number of tubes 20 interconnected by a number of control stations 21A, 21B, . . . 21G. At least one of the control stations 21F is coupled to a turbine 22 via a tube 20, with one or more of the control stations 21A-21G being further coupled to a number of loading stations 4A, 4B, . . . 4I, and a number of destination stations 5A, 5B, 5C, via respective tubes 20.

The processing system 6 is adapted to control the operation of the control stations 21 and the turbine 22, to thereby route carriers 2 through the air tube system 3, as will be appreciated by persons skilled in the art.

Figure 4:
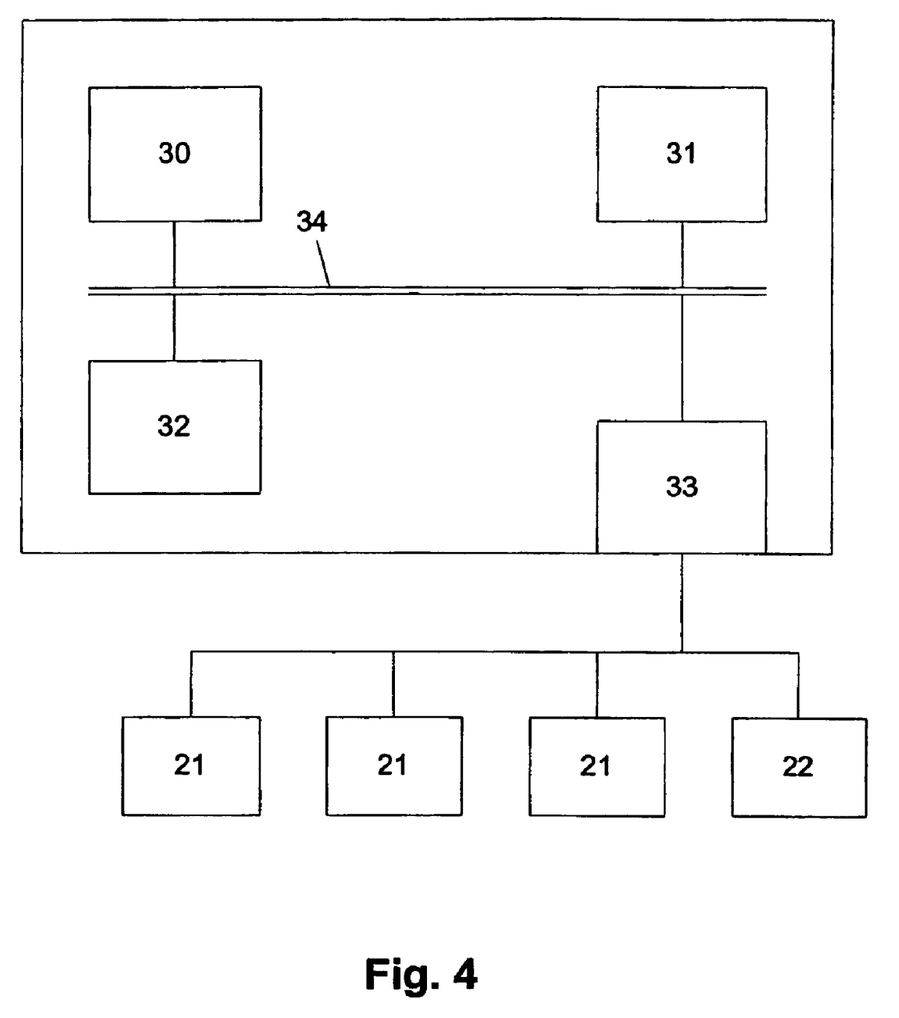
FIG. 4 is a schematic diagram of an example of the processing system of FIG. 1; and, FIG. 5 is a schematic diagram of an example of a gaming table.

An example of a suitable processing system 6 will now be described in more detail with respect to FIG. 4. In particular, in this example, the processing system 6 includes a processor 30, a memory 31, an input/output (I/O) device 32, and an external interface 33, coupled together via a bus 34. The I/O device typically includes a display, such as a computer monitor or the like, a keyboard, and one or more other input devices such as a mouse, joystick, trackball or the like.

In use, the external interface is coupled to the control stations 21 (only three of which are shown for clarity), and the turbine 22, to allow their operation to be controlled. These connections may be achieved using a communications network, such as a wired to wireless LAN, or direct wired to wireless connections, as will be appreciated by persons skilled in the art.

Accordingly, by generating appropriate control signals in accordance with applications software stored in the memory 31, the processor 30 can control the operation of the control stations 21 to selectively transfer the carriers 2. This is achieved by controlling the operation of the turbine 22 to selectively pressurise and depressurise the tubes 20 by pumping air in to or out of the tube 20 connected to the control station 21F. It will be appreciated that this is typically achieved through the use of an appropriate control valve system which may be used to couple the turbine 22 to the respective tube 20, or may form part of the control station 21F, or alternatively may be achieved by modifying the operation of the turbine 22 directly.

In any event, it will be appreciated that the processing system 6 may be formed from any one of a number of suitable processing systems, such as a suitably programmed computer, specialised hardware, or the like.

In use, when the carrier 2 is inserted into the tube 20 at the loading station 4A, the drive rings 15 are adapted to form a seal with the inner surface of the tube 20. The processing system 6 then causes the turbine to pump air out of the respective tube 20, thereby drawing the carrier along the tubes 20, from the loading station 4A, to the control station 21A. A similar procedure is then used to transfer the carrier 2 via the control stations 21A, 21B, 21E, to the control station 21F. The processing system 6 then causes the turbine to pump air into the tubes 20, thereby transferring the carrier 2, via the control stations control stations 21F, 21G to the destination station 5A. It will be appreciated by persons skilled in the art that the Velcro 16 is used to correctly align the carrier 2 within the tubes 20 to ensure smooth transfer of the carrier through the tubes 20, in the normal manner.

It will therefore be appreciated that the air tube system 3 may be an existing air tube system provided within a building or the like. Thus, for example, to allow the system to be integrated into existing air tubes systems, the carrier 2 is preferably dimensioned, and adapted to be used in existing tubes. Accordingly, the carrier typically has a length of between 360 mm and 400 mm and is adapted to travel in a tube having an inner diameter of 152 mm and an outer diameter of 160 mm. However, alternative tube systems can be used, in which case the dimension of the carrier may be adjusted accordingly.

Figure 5:
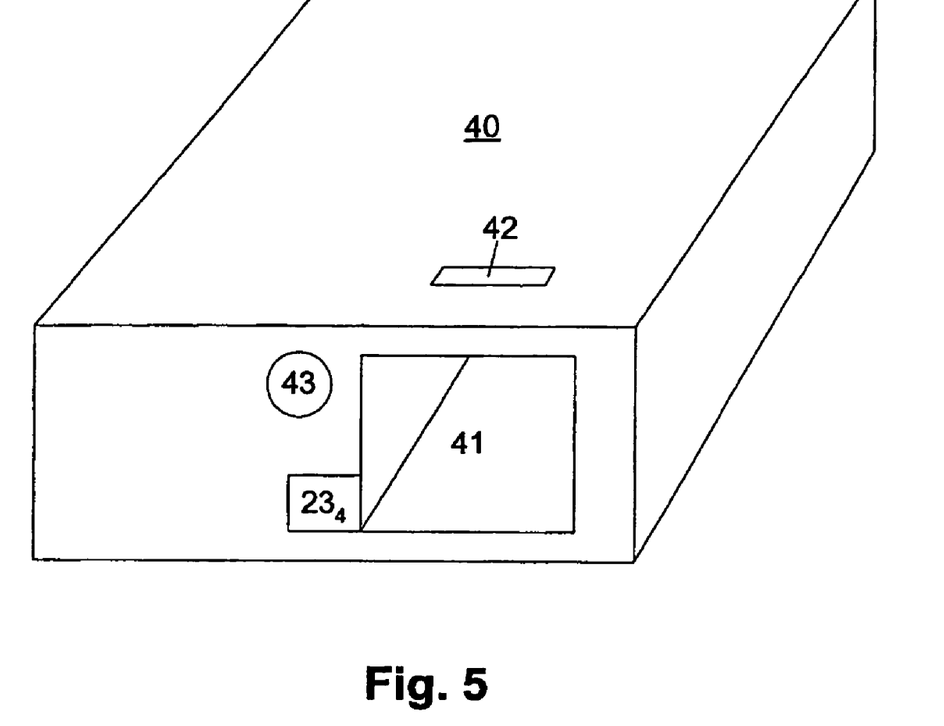

In a gaming environment such as a casino, gaming tables such as the gaming table 40 shown in FIG. 5, include a cavity 41 adapted to receive security boxes or the like. In use, the security box cooperates with a slot 42 provided in the table 40, to allow security documents, such as cash or gaming tokens, to be inserted through the slot 42 and into the security box. This ensures that once the security documents have been inserted through the slot into the security box, the documents cannot be removed without first removing the security box from the table. In existing gaming environments this is performed by security guards, who remove the security boxes to a remote secure location for opening and contents evaluation.

In this example of the present invention, the carrier 2 functions in a similar manner to the security box described above, and is therefore adapted to be mounted to gaming tables so as to allow security documents to be inserted directly through the slot 42 and the aperture 17A, into the carrier 2.

This may be achieved by providing appropriately configured gaming tables. In this case, it will be appreciated that each gaming table may correspond to a respective one of the loading stations 4, with the carrier being retained in the loading station 4 whilst it is being loaded with security documents through the slot 42 and the aperture 17A. Once the carrier 2 is loaded it can be removed from the table and transferred via the air tube system 3 to a destination station 5 in the manner described above. This obviates the need for any physical contact with the carrier 2, thereby reducing the opportunity for the carrier to be tampered with.

Figure 6:
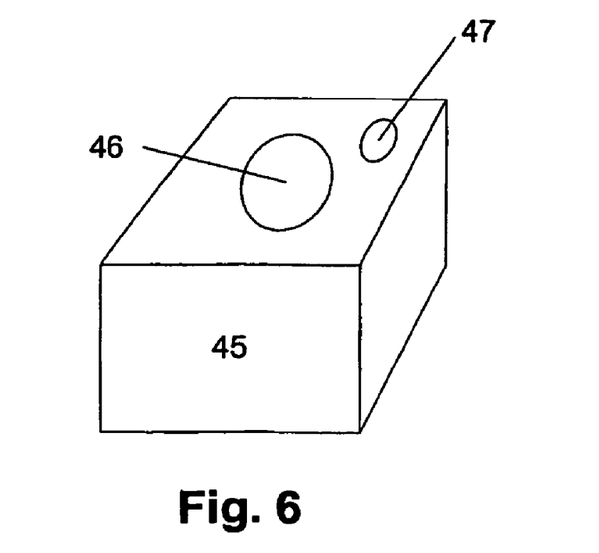
FIG. 6 is a schematic diagram of an example of the docking station of FIG. 1.

However, it will be appreciated that this requires the gaming table to be modified to act as a loading station 4, whereas it is advantageous to allow the carrier to be utilised with exiting gaming tables 40. This may be achieved by using the optional docking station 1 mentioned above, together with a remote loading station 4, as will now be described. An example of a suitable docking station 1 is shown in FIG. 6, and is formed from a body 45 that can be inserted into the cavity 41 in the same manner as a security box. This is typically achieved by use of runners or the like (not shown) mounted within the cavity 41, which cooperate with corresponding shoes or rails mounted on the body 45. In this case, the docking station 1 may be secured to the gaming table 40 to prevent removal therefrom. Thus, the docking station can form an integral part of the gaming table, or be provided as a separate element.

In any event, the body 45 includes a cavity 46 adapted to receive the carrier 2 in use. The cavity 46 and the carrier 2 are adapted so that the carrier must be inserted into the cavity in a pre-determined orientation. This may be achieved by the use of guides mounted in the cavity 46, which cooperate with appropriate recesses on the carrier 2, or the like. As a result, when the docking station 1 having a carrier 2 mounted therein is inserted into gaming table cavity 41, the aperture 17A aligns with the slot 41, allowing security documents to be inserted into the body 10 of the carrier 2 through the aperture 17A.

A lock 47 locks the carrier 2 into docking station body 45, thereby preventing unauthorised removal of the carrier 2 from the docking station 1. Furthermore, the docking station can be locked into the gaming table to prevent access to the cavity 46, using a lock 43 shown generally at 43.

In use, this provides a secure manner for transporting security documents. An example of this will now be described, with reference to transporting the documents from a gaming table in a gaming room, to a counting room, or the like.

Firstly, an empty carrier 2 having the shutter 17B in the open position is locked into the docking station 1, using the lock 47, as described above. The docking station 1 is then locked into the cavity 41 in the gaming table using the lock 43, as though it were a security box, in the normal manner.

During game play, the croupier or other member of staff will insert cash or other security documents through the slot 42 and the aperture 17A, into the carrier 2. At a suitable stage, such as when the carrier 2 is near full, or at the end of play, the lock 43 is unlocked, allowing the docking station 1 to be removed from the gaming table cavity 41. If the docking station 1 forms an integral part of the gaming table 40, it will typically not be possible to completely remove the docking station 1 from the cavity 41, thereby ensuring the docking station remains secure.

During this process, the latch 17D will cooperate with an actuator, so that as the carrier is removed from the gaming table 40, the latch is released, thereby causing the shutter to close, and prevent further access to the cavity 10A, through the aperture 17A.

The lock 47 is unlocked allowing the carrier 2 to be removed from the docking station 1, and carried by the croupier, or other member of staff to a loading station 4A located within the gaming room. In general, a respective loading station 4 will be provided for each few gaming tables, such that each table is close to a loading station 4.

The carrier 2 is then transported by the air tube system 3 to the desired destination station 5A, 5B, 5C, which in this case is contained in a counting room. This is controlled using the processing system 6, allowing the transfer of the carriers 2 to be controlled centrally. This allows the cash to be securely transported from the gaming room to the counting room, via the air tube system 3.

It will be appreciated that the croupier has only a short distance to travel to the loading station 4 thereby reducing the risks of attempted theft. Furthermore, the carrier 2 is then transported out of sight of the public, in the air tube system, to help further prevent theft, and thereby reducing or even removing the need for security guards.

The presence of the aperture 17A, and the lockable base 18, prevents the croupier from removing the cash or other security documents from the carrier 2, with enhanced security being provided by the use of the shutter 17B.

Once removed from the gaming table 40, access to the cavity 10A and the security documents contained therein can therefore only be achieved by operation of the dual bi-lock, to remove the base 18. The dual bi-lock requires the presence of two different keys to undo the lock and release the base 18. Accordingly, it is preferred that two individuals are provided with respective ones of the keys, such that the presence of both individuals is required within the counting room, to remove the cash from the carrier. Accordingly, once inserted into the slot 42 in the gaming table 40, the cash can only be accessed by the two individuals in the counting room.

Once the security documents have been removed, the shutter can be manually returned to the open position and the base 18 replaced, thereby allowing the carrier 2 to be reused.

In order to prevent the carrier being broken, the body 10 is preferably formed from a toughened material such as high impact polymers, metal or the like. Generally the material should have high impact resistance, dimensional stability, high mechanical strength, and surface hardness. Accordingly, aluminium alloys, acetals, or the like may be used.

It is also important that the carrier 2 satisfies predetermined weight requirements to allow the carrier to be used within existing air tube systems. This therefore further limits the materials that can be used in constructing the carrier 2.

Additional Functionality

A further security measure is the provision of a tracking system. This can be achieved in a number of manners. Thus for example, each carrier may be provided with a location positioning system such as GPS and a transmitter which periodically transmits the location of the carrier 2, together with a unique identifier, to a central receiving base station, such as the processing system 6. This allows the location of each carrier 2 to be tracked, so that if an attempt to steal a carrier 2 is made, the carrier 2 can be located.

However, the requirement for the carrier to include processing electronics and a transmission system requires a relatively high transmission power, which is undesirable for a number of reasons. Thus, for example, the power requirements make the transmission system relatively complex and weighty, thereby increasing the weight of the carrier 2, and in turn reducing the load capabilities of the carrier 2.

Figure 7:
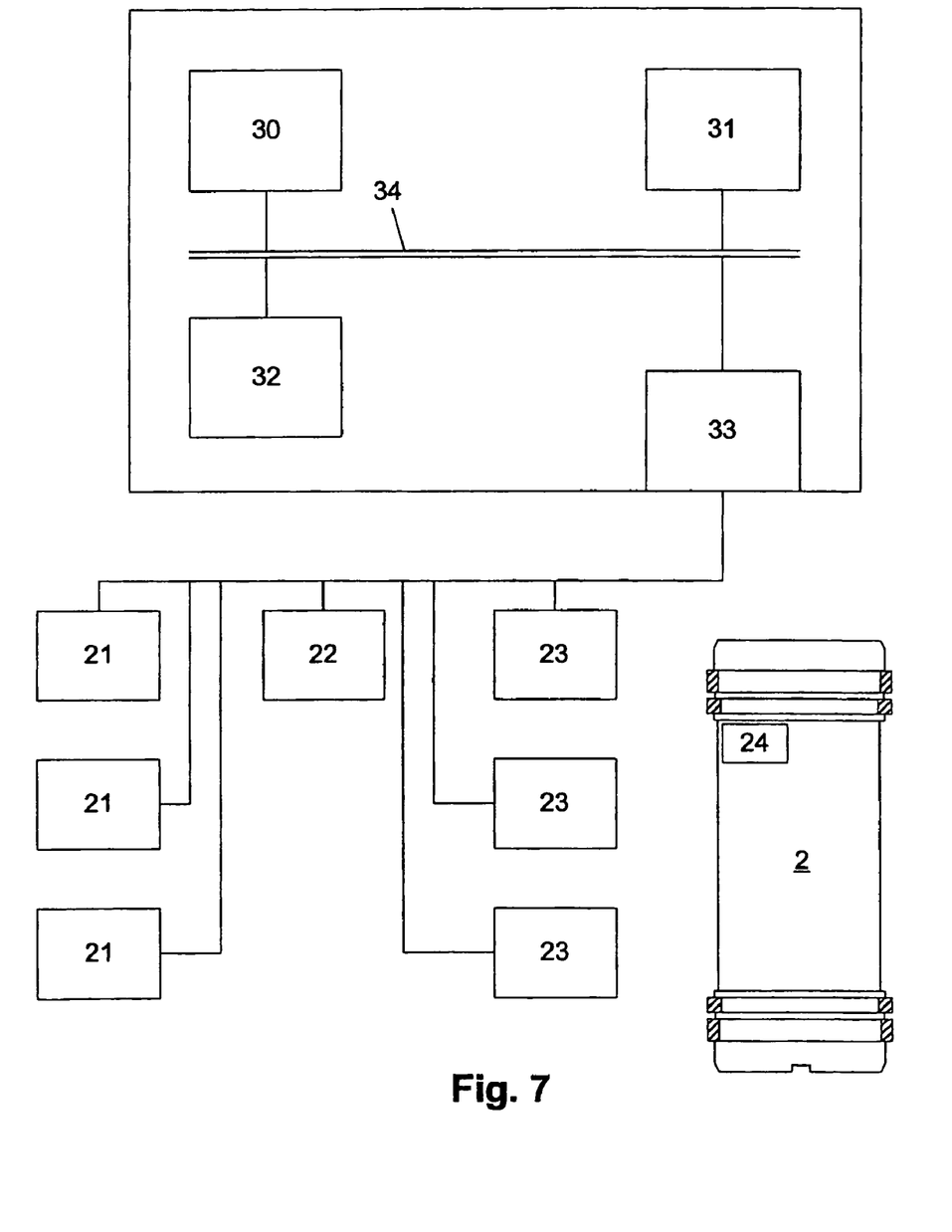
FIG. 7 is a schematic diagram of a second example of the processing system of FIG. 1.

An alternative tracking system is formed from a number of detectors 23 coupled to the processing system 6, via the external interface 33, as shown in FIG. 7. In one example, the detectors are mounted in the control stations 21, and are adapted to detect the passage of the carriers 2 through the control station 21, allow the processing system 6 to determine the location of the carrier 2 within the air tube system 3. It will therefore be appreciated that the connection between the control stations 21, the detectors 23, and the processing system 6 can be implemented using a common network or integrated connections. In particular, each control system may include a processor for performing some monitoring and control functionality locally.

In this case, each carrier 2 may be fitted with an identifier adapted to be detected by the detectors 23. An indication of this identifier is used by the processing system to allow the processing system 6 to determine the location and identity of carriers 2.

The nature of the detectors 23 and the identifier will depend on the respective implementation. Thus, for example, a shorter range radio system can be used, with each carrier would have a respective transmitter adapted to transmit a signal that can be received by detectors including appropriate antennas. As the carrier 2 passes by a detector 23, the antenna detects the signal, allowing the position of the carrier to be determined. In this case, the transmitter can be adapted to transmit a predetermined code which is then relayed to the processing system 6, to allow the processing system 6 to uniquely determine the carriers identity.

Alternatively, the identifier may be in the form of appropriate RFID (Radio Frequency D) tags provided in the carrier 2, as shown at 24. In this case, the detectors 23 are formed from appropriate transceivers adapted to communicate with the RFID tag, to enable an indication of the identifier to be determined, as will be appreciated by a person skilled in the art.

When a carrier passes by a detector 23, the transceiver will query the RFID tag and determine the identifier therefrom, with an indication of this being transferred back to the processing system 6. In this case, the communication between the detectors 23 and the RFID tag can be achieved wirelessly, with power being transferred inductively to the RFID tag to allow any on board processing electronics to be powered by an external power source. It will be appreciated that this allows the RFID tag to be small, lightweight, cheap and substantially maintenance free.

Alternative means, such as optically or magnetically encoding information on the carrier body 10, for example by using barcodes, or the like. In this case, the detector 23 is provided in the form of an appropriate optical or magnetic detector, such as a barcode reader.

Alternatively, or additionally, the detectors 23 can be mounted at various locations along the length of the tubes 20, as shown in FIG. 3. This allows the processing system 23 to monitor the location of the carriers between the control stations 21. The detectors, can also be directional, allowing the direction of the travel, or position of the carrier 2 along the length of the tube 20 to be determined.

Alternatively, or additionally, detectors 234 can be provided on the loading stations 4 to determine when a carrier has been inserted into the loading station 4, thereby allowing the processing system 6 to activate the air tube system 3, to cause the carrier to be transferred.

It will be appreciated that by suitable positioning of the detectors 23, 23$_4$ allows the position of the carriers 2 to be uniquely determined. Furthermore, a monitoring system, such as a suitably programmed processing system, can be provided to monitor passage of the carriers 2, to thereby detect if any carriers become diverted, stuck, or go missing. This will allow the location of the disappearance to be identified, thereby helping trace any missing carriers 1.

In general, the processing system may be provided as part of the system that operates the control stations 22 to route the carriers 2 through the tube 20 in accordance with normal routing protocols. Accordingly, a separate processing system may be provided for additional security.

It will be appreciated that in the short-range transmission system, passive wireless transmission can be used, in which the detectors generate a carrier signal that is used to power a radio transceiver in the carrier 2. This allows data to be back-scatter modulated to the detectors 23 without requiring the presence of an additional power source in the carrier 2, as will be appreciated by persons skilled in the art.

In the above-mentioned examples, each carrier may be adapted to transmit a coded identifier code to the processing system 6, either directly, or via the detectors 23, allowing each carrier 2 to be uniquely identified. This further helps monitor the location of the carriers 1, thereby further improving security.

For example, this can be used to record an audit trail so that the passage of each carrier 2 through the system is recorded and stored in a database (not shown). In this case, the record of the carrier movements can be stored in an encrypted fashion together with associated time stamps, to thereby prevent the data being subsequently manipulated. This allows the carrier movements to be uniquely determined at any time in the future, such that should a theft occur, the location of the respective carrier during the time of theft may be determined.

In addition to this, the use of unique identifiers allows the carriers 2 to be directed automatically through the tube system 1 to selected destination stations 5 as required.

A further modification that can be made is for the processing system 6 to be adapted to monitor the time taken for the carriers to be transferred between respective detectors 23. In this case, the processing system 6 would monitor the time taken for a carrier 2 to travel between any two detectors within the air tube system 23, by monitoring for the passage of the carrier passed respective detectors 23. The time taken is compared to a predetermined threshold representing the time that the transfer should take. This threshold can be based on the geometry of the tubes 20 and the relative positioning of the detectors 23, or can be determined in accordance with testing performed using appropriate test carriers 2. The threshold will typically be stored in the memory 21, or may alternatively be provided in a remote database, as will be appreciated by persons skilled in the art.

In any event, in this example, if the carrier takes longer than the predetermined threshold to travel between successive detector locations, this indicates either that there is a fault with the system, or that the carrier 2 has been tampered with during transit.

It will be appreciated that this can be used to alert security personnel should an attempted theft occur. This can be achieved in a number of manners. Thus, for example, an indication of the exceeding of the respective threshold could be displayed on the I/O device 33 provided with the processing system 6. This allows an operator to signal an alarm, or contact security personnel, or the like.

Alternatively, the processing system 6 can be coupled to one or more remote communications devices, such as pagers, or the like, via an appropriate communications system. This allows the processing system 6 to alert the security personnel directly through the use of pagers, SMS communications to mobile phones, or the like. This ensures that the security personnel are notified as soon as a problem occurs.

During the above mentioned process, when the processing system 6 detects the location of a carrier 2 the processing system 6 can determine the carrier identifier and the location of the respective detector 23, and record this in the memory 21. This allows a log of all carrier movements to be stored in the memory 21, as will be appreciated by persons skilled in the art.

The carrier identifier can also be used to control routing of the carriers through the air tube system 3. Thus, for example, a carrier with a specific identifier may be associated with a respective gaming table 40, and hence with respective loading and destination stations 4, 5. In this instance, when the carrier is loaded into the respective loading station 4, the processing system 6 detects the respective carrier identifier, and determines the intended destination station 5 from an LUT (Look Up Table) stored in the memory 21. In this case, the carrier will be routed to the destination station in the manner described above, with the processing system 6 monitoring the transfer to detect any tampering or routing faults.

The carrier will be delivered to the respective destination station 5 which may be incorporated into a counting room, allowing the security documents to be removed and counted. The carrier can then be inserted into the respective destination station 5 and returned to the respective loading station 4, allowing it to be reused.

Figure 8:
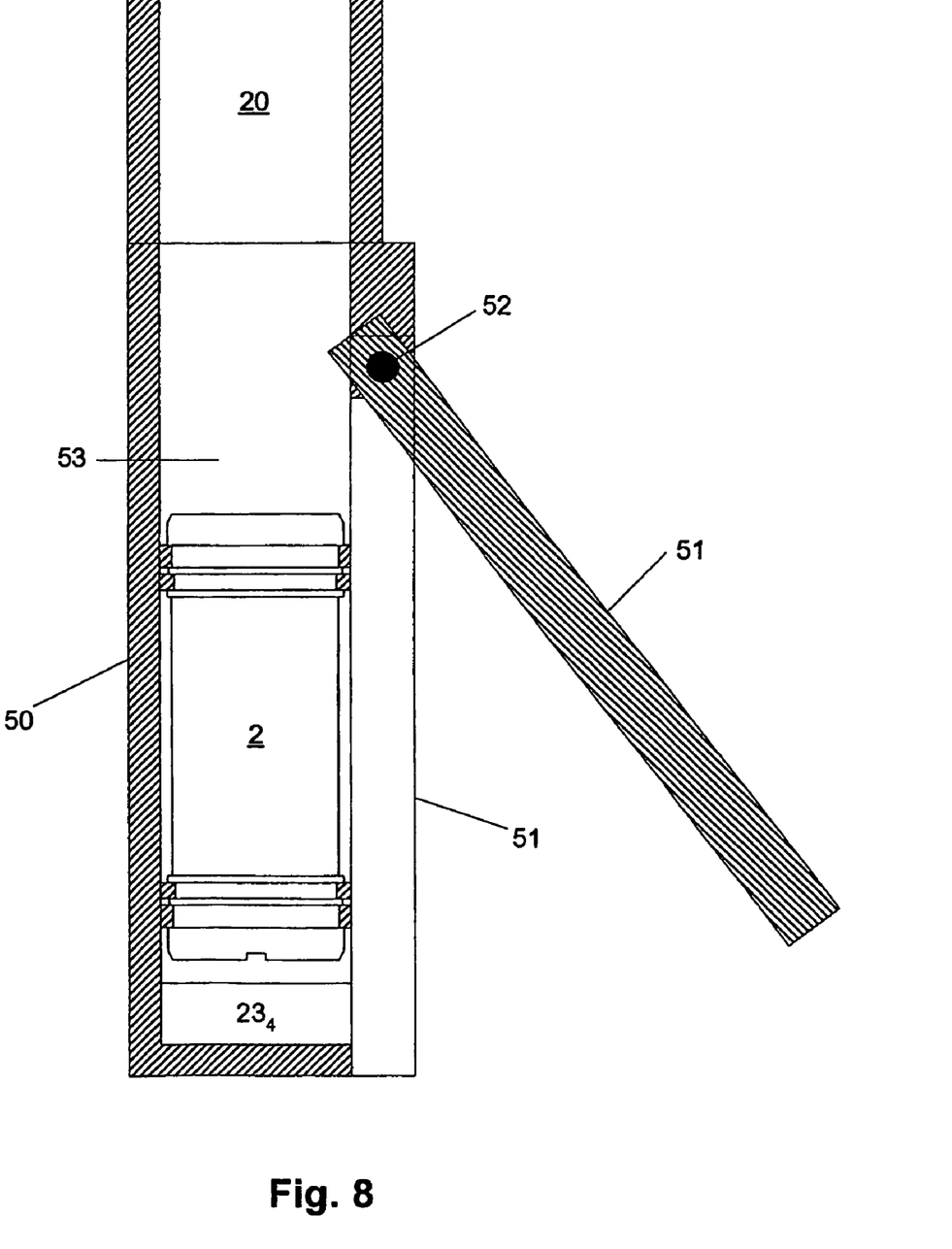
FIG. 8 is a schematic diagram of an example of the loading station of FIG. 1; and, FIGS. 9A and 9B are a flow chart of the manner of operation of a specific system.

To provide further enhanced security, the loading stations 4, and optionally the destination stations 5 can be provided with a cover which needs to be removed in order to allow the carrier to be inserted into the loading station. An example of this is shown in FIG. 8. In this example, the loading station 4 includes a body 50, having a cover 51 pivotally mounted thereto as shown at 52. The body 50 and the cover 51 cooperate to define a cavity 53 when the cover 51 is in a closed position shown by the dotted lines. The cavity is coupled at one end to a tube 20, allowing the carrier 2 to be inserted into the cavity 53, and the drawn into the tube when the air is pumped out.

In this example, a detector $23_4$ is incorporated into the loading station 4, to allow the processing system 6 to determine when the cover 51 is opened. This allows the processing system 6 to initiate timing of the transfer of the carrier through the air tube system, as described above. It also allows an alert to be generated in the event that no carrier is inserted into the loading station 4, or if the cover 51 is left open.

A further development is for the gaming table to incorporate a detector $23_{40}$, to allow the presence of a carrier within the docking station 1 to be monitored. In this case, the processing system 6 can use signals from the detector 23 provided in the gaming table to determine when the carrier 2 is removed therefrom. It will be appreciated that this allows the processing system to monitor for insertion of the carrier 2 into the loading station 4 associated with the respective gaming table.

Again, the processing system 6 is typically adapted to monitor the time taken to perform this procedure and generate an alert, allowing security to check the location of the carrier 2, if a predetermined time limit is exceeded.

It will be appreciated that in the event that the carrier 2 has been tampered with or stolen, this will minimise the time between this occurring and an alert being generated.

A number of other variations on the above are also possible. For example, the processing system 6 can be adapted to provide an indication of the current location of all carriers within the system. This can be provided in the form of a system map which shows the current location of the control stations 21 in a 3-dimensional image representation generated from data stored in the memory 21. In this example, different status indications can be associated with respective carriers 2 or control stations 21 the representations indicating the current status and function of the respective element. Thus, for example, if a carrier 2 is currently in use this can be indicated a first colour and a second colour provided if the carrier 2 is delayed or tampered with.

Specific Implementation

Figure 9A:
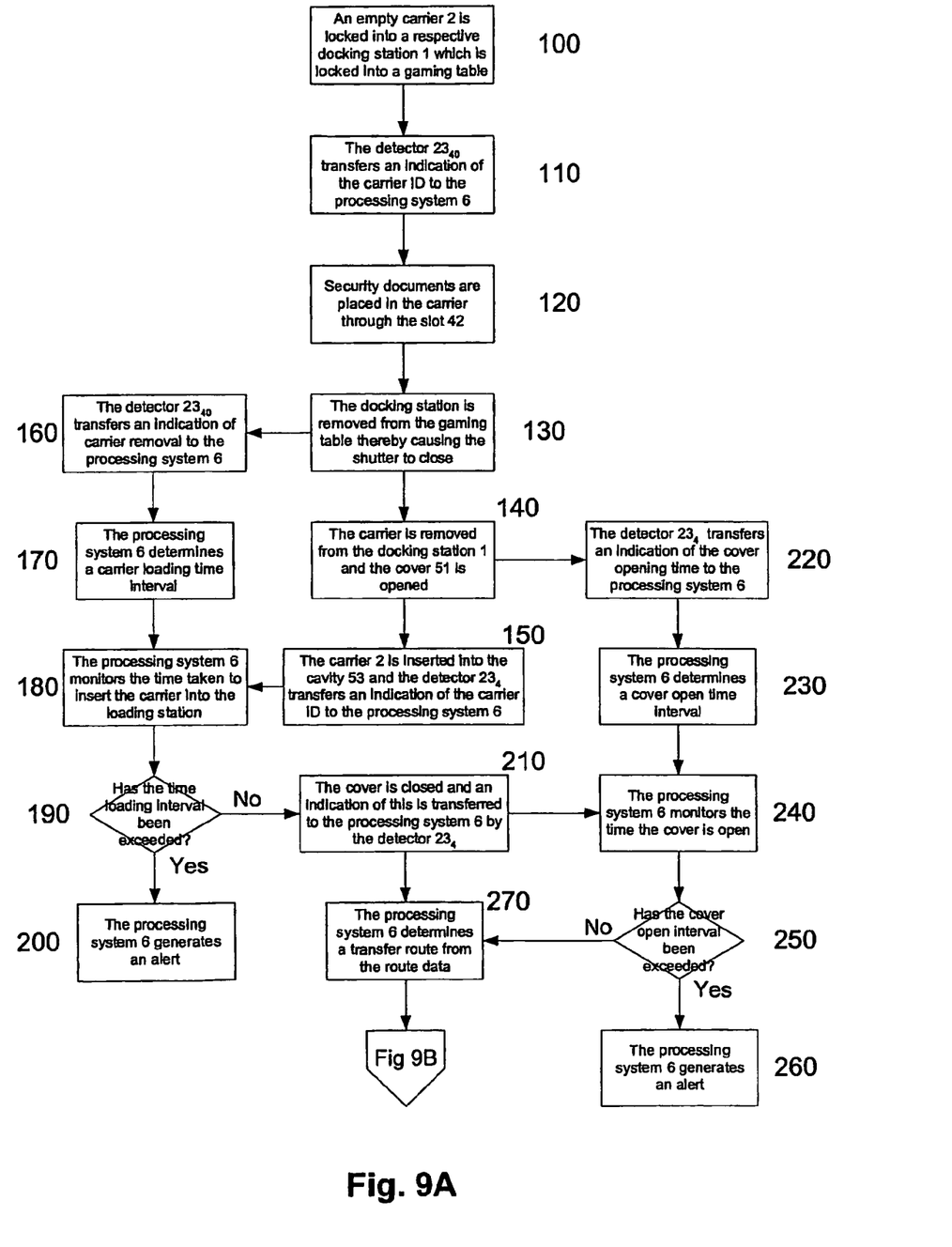
Figure 9B:
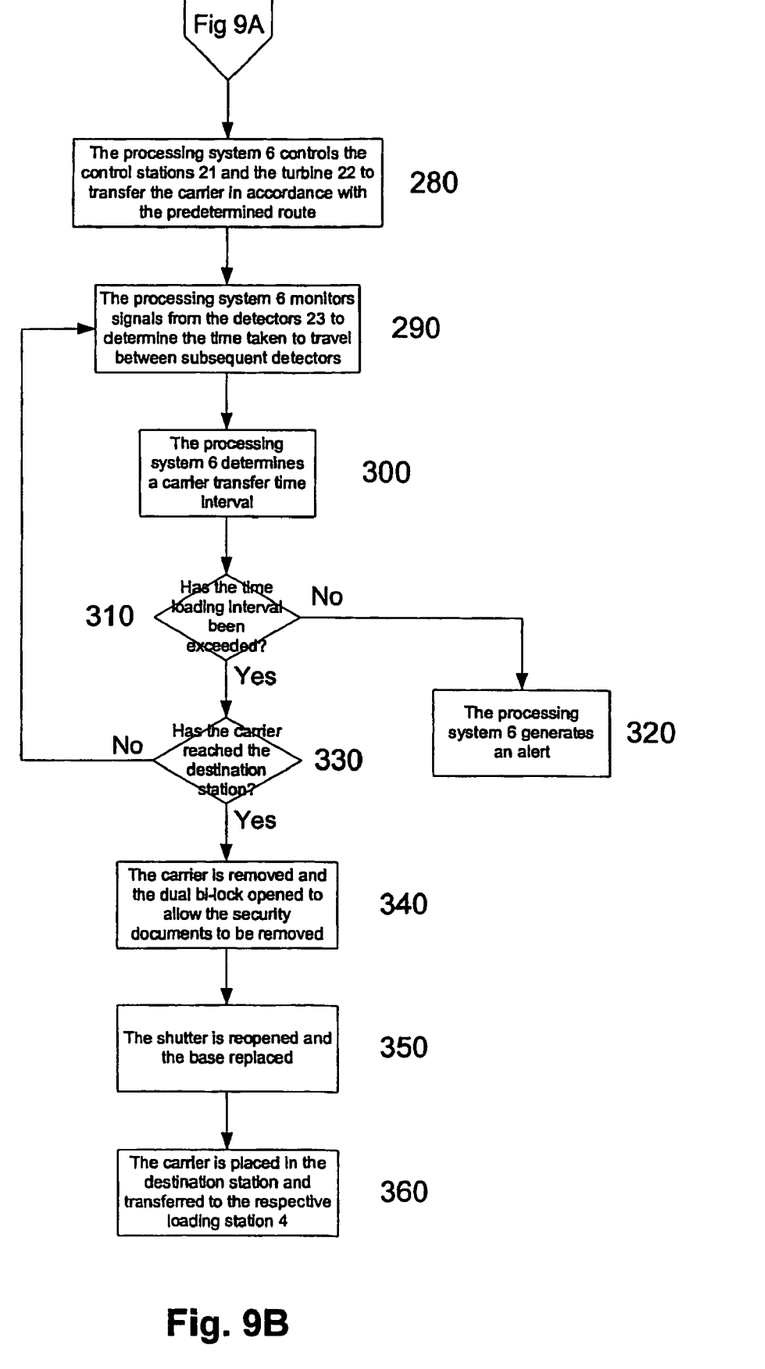

An example of a specific implementation of the invention incorporating a number of the features described above will now be described with reference to the flow charts shown in the FIGS. 8A and 8B.

At step 100 an empty carrier 2, with an open shutter 17B, is locked into a respective docking station 1 which is then locked into a gaming table 40. At step 110 the detector $23_{40}$ transfers an indication of the carrier ID to the processing system 6. The processing system 6 will typically store an indication of the carrier ID, together with the time and date of insertion in a log.

At step 120 security documents are placed in the carrier through the slot 42. Once the carrier 2 is full, or at a predetermined time, the docking station is unlocked removed from the gaming table 40 at step 130. This action causes the latch 17D to cooperate with an appropriate actuator on the gaming table, thereby causing the shutter 17B to close.

At step 140 the carrier 2 is removed from the docking station 1 and the cover 51 opened to allow the carrier 2 to be inserted into the cavity 53 of the loading station 4 at step 150.

During this process, at step 160, the detector $23_{40}$ transfers an indication of carrier removal to the processing system 6. The processing system uses the carrier ID to access a carrier loading time interval, which is typically stored in the memory 21. This loading time interval represents the maximum amount of time that should be required to insert the carrier into the loading station. At step 180, the processing system 6 monitors the time taken to insert the carrier into the loading station in accordance with signals obtained from the detector 234 at step 150.

If at step 190 the processing system 6 determines that the loading time interval has been exceeded and the carrier 2 has not been loaded, then the processing system 6 generates an alert at step 200. As described above, this alert may be an indication on the I/O device 32, or may be provided directly to security personnel via remote communications devices.

If the loading time interval has not been exceed, then the process continues to step 210, allowing the cover to be closed and an indication of this to be transferred to the processing system 6.

During this process, the detector $23_4$ also transfers an indication of the cover opening time to the processing system 6, at step 220. At step 230, the processing system 6 obtains a cover open time interval, for example from a suitable LUT stored in the memory. The cover open time interval indicates the maximum duration for which the cover 51 should remain open during the loading process. Again, this is monitored by the processing system 6 at step 240, such that if it is determined that the cover open interval is exceeded, an alert can be generated at step 260. The cover 51 may be optionally automatically closed at this point.

At step 270 the processing system 6 accesses route data stored in the memory 21 to determine a respective transfer route. In particular, this is achieved in accordance with the carrier ID and it would therefore be appreciated that routes are programmed into the processing system 6 for each carrier associated with the system. This ensures that carriers are only transferred between respective locations there by helping to ensure that carriers are always transferred to the correct destination station 5. This also ensures that employees, such as the croupiers have no control over the route of the carriers.

This is important, as carriers from different regions will need to be transferred to different destination stations 5 depending on the respective security documents contained therein. Thus, for example, a 2 carrier obtained from a high roller table may need to be transferred to a more secure counting room due to the larger value of the security documents contained therein. Alternatively, this may be achieved by routing carriers in accordance with the respective loading station 4 into which the carrier 2 was loaded.

At step 280 the processing system 6 controls the control stations 21 and the turbine 22 to transfer the carrier to in accordance with the predetermined route. At step 290 the processing system 6 monitors signals from the detectors 23 to determine the current position of the carrier 2, and in particular the time taken for the carrier 2 to travel between subsequent detectors in the air tube system.

The processing system 6 then determines a carrier transfer time interval. This is usually achieved by accessing the route data using an indication of the last detector 23 passed, to determine the time until the next detector is reached.

The processing system 6 monitors the time taken to travel between the detectors 23, and if it is determined that the transfer time interval is exceed at step 310, an alert is generated at step 320, substantially as describe above.

Otherwise, the processing system 6 operates to determine if the carrier has reached the destination station 5 at step 330. If not, the process returns to step 290, to allow monitoring of the carrier 2 to be continued.

At step 340, once the respective destination station 5 is reached, the carrier is removed from the destination station 5 and the dual bi-lock opened using both keys to allow the security documents contained in the carrier to be removed and evaluated.

At step 350 the shutter 17B is opened and the base 18 replaced and locked. The carrier 2 is than placed in the destination station 5 at step 360, and automatically transferred to the respective loading station 4 under control of the processing system 6, in a manner similar to that described above. Accordingly, it will be appreciated that the carrier is now available for reuse.

Accordingly, the present invention provides a system, which allows security documents to be transferred in high-risk environments and under secure conditions and without the need for security guards.

This allows the system to be used in a wide range of locations in which security documents need to be transferred, and in which it is desirable to provide secure transfer without need for a large number of security guards.

Thus, for example, the system can be implemented in a racing environment, allowing bookmakers and turf clubs to receive cash and then transfer this to a secure location. In this example, it will be appreciated that each bookmaker may use respective carriers allowing their takings to be uniquely tracked an identified, thereby ensuring that security documents from different bookmakers are not mixed up, even tough they are been transferred using a common system.

In this regard, the system can be fitted into environments where a number of pitches, or locations are selectively used. This is achieved by providing an open ended tube 20 where loading stations 4 may be required. In this case, when a respective location is used, a loading station 4 can be coupled to the tube 20, with the detector $23_4$ being used to ensure that monitoring of carriers inserted into the system is correctly achieved.

It will be appreciated that in this example, as gaming tables are not provided, the docking stations are not required. However, in this example, the loading stations may be modified to include a slot adapted to cooperate with the aperture 17A on the carrier 2. In this case, security documents can be inserted into the carrier without the need to remove the carrier from the loading station. As a result, the cover 51 can be replaced with a sealed body such that the carrier 2 can not be removed from the system at the loading station 4.

In this example, empty carriers 2 would be transferred from a destination station 5 in a counting room and transferred to the loading station. The security documents can be inserted into the aperture 17A, through a slot in the loading station 4, with the carrier being automatically returned to the destination station 5, either in accordance with input commands, or at a predetermined time. A replacement carrier can then be provided at the loading station 4, to allow further security documents to be loaded, whilst the contents of the first carrier 2 are removed. It will be appreciated that this further enhances the security of the system by preventing any individuals, other than those in secure locations, from coming into physical contact with the carriers 2.

In addition to the functionality described above, it is also possible to arrange for security document counters to be positioned in a location adjacent the aperture 17A in use. Thus, for example, a bank note validation and/or counting machine may be positioned adjacent the aperture 17A to allow bank notes inserted into the carrier 2 to be counted and/or validated.

Thus, in the example of the gaming table, the bank note machine could be positioned between the slot 42 and the aperture 17A to count bank notes inserted into the carrier 2. An indication of the total value of the banknotes inserted into the carrier can then be communicated to the processing system 6 and stored together with the carrier D of the respective carrier, obtained from the detector $23_{40}$ which may form part of the bank note machine. In any event, it will be appreciated that this allows a number of additional security checks to be performed, in particular, to validate the value of the contents of each carrier.

Persons skilled in the art will appreciate that numerous variations and modifications will become apparent. All such variations and modifications which become apparent to persons skilled in the art, should be considered to fall within the spirit and scope that the invention broadly appearing before described.

The claims defining the invention are as follows:

1. A combination, comprising:
an air tube system, and
a carrier for transferring security documents, the air tube system having a tube for transporting the carrier from a source to a destination,
the carrier including:
a) a substantially cylindrically shaped housing defining an internal cavity, the housing being adapted to cooperate with the tube in use, to allow the carrier to be transported;
b) a lid coupled to a first end of the housing, the lid including an aperture adapted to allow documents to be inserted into the cavity;
c) a base removably mounted to a second end of the housing opposite the first, the base being removable to allow access to the cavity;
d) a lock for retaining the base in place; and
e) a shutter movably mounted to the lid, the shutter being adapted to move between an open position and a closed position in which the aperture is blocked.

2. The combination according to claim 1, the lock comprising a key locked mechanism.

3. The combination according to claim 1, the aperture comprising a narrow slot.

4. The combination according to claim 1, the carrier including:
- a shutter opening system positioned in the cavity, and being adapted to be activated manually to thereby allow the shutter to be opened; and
- a shutter closing mechanism, the shutter closing mechanism being provided on the outside of the housing, and being adapted to be activated once security documents have been inserted into the cavity.

5. A combination of the carrier according to claim 4 and a gaming table, the carrier being adapted to be positioned in a docking station of the gaming table, to allow the carrier to be positioned in the gaming table in use, with the aperture aligned with a game table slot.

6. The combination according to claim 5, the gaming table including an actuator for activating the shutter closing mechanism when the carrier is removed from the gaming table.

7. A combination of the carrier according to claim 1 and the air tube system, the carrier including an identifier, the air tube system including a number of detectors positioned at respective locations in the air tube system, the detectors being adapted to:
- a) detect the identifier of carriers traversing the location; and
- b) transfer an indication of the identifier to a controller adapted to determine the location of the carrier in accordance with the detector and the identifier.

8. The combination according to claim 7, the carrier including a communications system for transferring an indication of the identifier to the detector.

9. The combination according to claim 8, the transmitting system being formed from an RFID system.

10. A combination of the carrier according to claim 1 and a docking system for receiving the carrier, the docking system including a substantially cylindrical shaped cavity adapted to receive the carrier, the docking system being adapted to cooperate with a gaming table such that documents inserted through a gaming table slot are received by the carrier aperture.

11. The combination according to claim 10, the docking system including a locking mechanism, the locking mechanism being adapted to selectively retain the carrier in the cavity.

12. The combination according to claim 11, the docking system being adapted to cooperate with an aperture in the gaming table, for allowing the docking stations to be moved from an open position in which the cavity is accessible to allow the carrier to be inserted therein, and a closed position in which the carrier aperture is aligned with the slot.

13. The combination according to claim 10, the cavity including one or more guides, the guides being adapted to cooperate with one or more carrier guides mounted to carrier to thereby align the carrier in the cavity.

14. A combination of a plurality of the carrier according to claim 1 and a controller adapted for use in an air tube system, the air tube system including a number of controlling stations for selectively transferring carriers, along interconnecting tubes between loading stations and destination stations, and one or more detectors for detecting the position of the carriers within the tubes, the controller being adapted to:
- i) cause the controlling stations to transfer a carrier loaded at a respective loading station to a destination station;
- ii) monitor signals from the detectors to determine the changes in the position of carriers;
- iii) compare the changes in the position of each carrier to predetermined criteria; and
- iv) generate an indication in response to the comparison.

15. The combination according to claim 14, each carrier including a respective identifier, the detectors being adapted to determine the respective identifier of each carrier and transfer an indication of this to the controller, being responsive to the identifier and the respective detector to determine the position of the respective carrier.

16. The combination according to claim 15, the controller being adapted to transfer each carrier between respective loading and destination stations in accordance with the respective identifier.

17. The combination according to claim 14, the controller including: a) a store far storing the predetermined criteria in the form of predetermined thresholds; and b) a processor coupled to the store, the processor being adapted to: i) determine the current position of the carrier; ii) store an indication of the current position in the store; iii) compare the current time taken to move between subsequent positions to the selected ones of the predetermined thresholds stored in the memory; and iv) generate an alert in accordance with an unsuccessful comparison.

18. The combination according to claim 17, the alert being at least one of an audible or visual alert.

19. The combination according to claim 18, the predetermined threshold being selected in accordance with the most recent position of the carrier.

20. The combination according to claim 17, the processor being further adapted to store an indication of the carrier positions together with an associated time indication in the store.

21. A combination of a plurality of the carrier according to claim 1 and an air tube system for transferring security documents, the air tube system including:
- a) a number of tubes;
- b) one or more loading stations coupled to the tubes, the loading stations being adapted to allow the carriers including security documents to be loaded into the tubes;
- c) one or more destination stations coupled to the tubes, the destination stations being adapted to receive the carriers from the tubes;
- d) a pump for pumping into, or out of selected ones of the tubes;
- e) one or more controlling stations for selectively interconnecting the tubes;
- f) a number of detectors for detecting the position of the carriers within the tubes; and
- g) a controller coupled to the controlling stations and the detectors, the controller being adapted to:
  - i) cause the controlling stations to transfer the carriers loaded at a respective loading station to a destination station; and
  - ii) monitor signals from the detectors to determine the changes in the position of the carriers.

22. The combination according to claim 21, the controller being further adapted to:
- i) compare the changes in the position of each carrier to predetermined criteria; and
- ii) generate an indication in response to the comparison.

23. The combination according to claim 22, the controller being adapted to:
- i) cause the controlling stations to transfer a carrier loaded at a respective loading station to a destination station;
- ii) monitor signals from the detectors to determine the changes in the position of earners;

iii) compare the changes in the position of each carrier to predetermined criteria; and iv) generate an indication in response to the comparison.

24. The combination according to claim 21, further comprising a gaming table, the air tube system being adapted for use in a gaming environment, the air tube system further including a docking station, the docking system including a substantially cylindrical shaped cavity adapted to receive one of the carriers, the docking system being adapted to cooperate with the gaming table such that documents inserted through a gaming table slot are received by the aperture of one of the carriers.

25. A method of transferring security documents from a source to a destination, the method including:

providing the combination according to claim 1;

a) loading the security documents into the carrier;

b) transferring the carrier from a loading station to a destination station via an air tube system;

c) detecting the position of the carrier within the air tube system;

d) comparing the position of the carrier within the air tube system to predetermined criteria; and e) generating an indication in accordance with the results of the comparison.

26. A method according to claim 25, the method being performed using a controller for controlling the air tube system.

27. The combination according to claim 1, the lock comprising a dual key lock.

28. The combination according to claim 1, further comprising a biasing member that biases the shutter to the closed position, wherein the shutter closing mechanism comprises a first end of a latch that extends outside of the housing, and the latch releases the shutter when the shutter closing mechanism is activated.

29. The combination according to claim 28, wherein the shutter opening mechanism comprises a second end of a latch that extends into the cavity.

* * * * *